(12) United States Patent
Chen et al.

(10) Patent No.: US 9,634,565 B2
(45) Date of Patent: Apr. 25, 2017

(54) MODULATION METHOD, AND MODULATION MODULE AND VOLTAGE CONVERTING DEVICE THEREOF

(71) Applicant: Anpec Electronics Corporation, Hsin-Chu (TW)

(72) Inventors: Chih-Yuan Chen, Hsinchu (TW); Hsin-Tai Lin, Taichung (TW)

(73) Assignee: Anpec Electronics Corporation, Hsin-Chu (TW)

( * ) Notice: Subject to any disclaimer, the term of this patent is extended or adjusted under 35 U.S.C. 154(b) by 73 days.

(21) Appl. No.: 14/085,758

(22) Filed: Nov. 20, 2013

(65) Prior Publication Data
US 2015/0061625 A1 Mar. 5, 2015

(30) Foreign Application Priority Data

Aug. 30, 2013 (TW) .............................. 102131317 A

(51) Int. Cl.
*H02M 3/156* (2006.01)
*H02M 3/158* (2006.01)
*H02M 1/44* (2007.01)
*H02M 1/00* (2006.01)

(52) U.S. Cl.
CPC ............. *H02M 3/158* (2013.01); *H02M 1/44* (2013.01); *H02M 3/156* (2013.01); *H02M 2001/008* (2013.01); *H02M 2003/1586* (2013.01)

(58) Field of Classification Search
CPC .... H02M 3/156; H02M 3/158; H02M 3/1582; H02M 3/1563; H02M 3/157; H02M 2003/1566; H02M 2003/1557; H02M 2001/0045; H02M 2001/0012; H02M 2001/0009; H04B 2215/069
USPC .......................... 323/267, 282–285, 299–300
See application file for complete search history.

(56) References Cited

U.S. PATENT DOCUMENTS

| | | | |
|---|---|---|---|
| 7,007,176 B2 * | 2/2006 | Goodfellow et al. | 713/300 |
| 7,023,187 B2 * | 4/2006 | Shearon et al. | 323/266 |
| 7,205,752 B2 * | 4/2007 | Jansen | 323/272 |
| 7,221,131 B2 * | 5/2007 | Ozawa et al. | 323/272 |
| 7,239,119 B2 * | 7/2007 | Baurle et al. | 323/284 |
| 7,714,549 B2 * | 5/2010 | Takemura | 323/244 |
| 8,193,798 B1 * | 6/2012 | Pace et al. | 323/284 |

(Continued)

FOREIGN PATENT DOCUMENTS

| | | |
|---|---|---|
| TW | 519792 | 2/2003 |
| TW | 200633352 | 9/2006 |

(Continued)

*Primary Examiner* — Harry Behm
*Assistant Examiner* — Bryan R Perez
(74) *Attorney, Agent, or Firm* — Winston Hsu; Scott Margo

(57) ABSTRACT

A modulation method, for a voltage converting device, includes generating a first modulation signal according to an input voltage and a first output voltage; generating a second modulation signal according to the input voltage and a second output voltage; adjusting the first modulation signal and the second modulation signal according to a clock signal for making a first starting time of the first modulation signal be different from a second starting time of the second modulation signal; and generating the first output voltage and the second output voltage according to the input voltage, the first modulation signal and the second modulation signal.

3 Claims, 6 Drawing Sheets

(56) References Cited

U.S. PATENT DOCUMENTS

| | | | |
|---|---|---|---|
| 8,618,779 B2* | 12/2013 | Garrett et al. | 323/271 |
| 2003/0020437 A1* | 1/2003 | Kanamori | 323/222 |
| 2003/0193364 A1* | 10/2003 | Liu | H02M 3/1588 327/536 |
| 2007/0013350 A1* | 1/2007 | Tang et al. | 323/237 |
| 2007/0139023 A1* | 6/2007 | Hasegawa | H02M 3/158 323/271 |
| 2011/0025284 A1* | 2/2011 | Xu | H02M 3/1584 323/282 |
| 2011/0109290 A1* | 5/2011 | Tang et al. | 323/282 |
| 2011/0121806 A1* | 5/2011 | Garrett et al. | 323/282 |
| 2012/0013321 A1* | 1/2012 | Huang et al. | 323/282 |
| 2012/0126772 A1* | 5/2012 | Yamakoshi | H02M 1/36 323/284 |
| 2012/0146609 A1* | 6/2012 | Seki | H02M 3/156 323/284 |
| 2013/0169358 A1* | 7/2013 | Drogi et al. | 330/127 |
| 2013/0241516 A1* | 9/2013 | Ueno et al. | 323/285 |

FOREIGN PATENT DOCUMENTS

| | | |
|---|---|---|
| TW | 200744292 | 12/2007 |
| TW | 200746596 | 12/2007 |
| TW | 201234753 | 8/2012 |
| TW | 201249043 | 12/2012 |

* cited by examiner

MODULATION METHOD, AND MODULATION MODULE AND VOLTAGE CONVERTING DEVICE THEREOF

BACKGROUND OF THE INVENTION

1. Field of the Invention

The present invention relates to a modulation method, and a modulation module and voltage converting device thereof, and more particularly, to a modulation method capable of staggering starting times of modulation signals, and a modulation module and voltage converting device thereof.

2. Description of the Prior Art

Electronic devices are comprised of many different elements, which operate with different operational voltages. It is therefore necessary to utilize different DC-DC voltage converters in order to achieve different voltage modulations, such as modulation for raising voltage values or degradation voltage values, and to maintain predetermined voltage values. Widely employed DC-DC voltage converters are derived from the buck/step down converter or the boost/step up converter. The buck converter can decrease an input DC voltage to a default voltage level, and the boost converter can increase the input DC voltage to another default voltage level. Both the buck and boost-type converters have been varied and modified to conform to different system architectures and requirements.

Voltage converters (e.g. the DC-DC voltage converters) use the same input voltage to generate output voltages with different voltage levels to different components of the electronic device. The input voltage needs to provide a significant current for driving the circuit, while also being used to generate multiple output voltages. The input voltage may therefore undergo a considerable disturbance which affects the stability of the voltage converter. How to reduce this disturbance in the input voltage while it is used to output multiple output voltages has become an important topic in this field.

SUMMARY OF THE INVENTION

In order to solve the above problem, the present invention provides a modulation method capable of dynamically adjusting the modulation signals, which is capable of staggering starting times of modulation signals. A modulation module and voltage converting device thereof are also provided.

The modulation method comprises generating a first modulation signal according to an input voltage and a first output voltage; generating a second modulation signal according to the input voltage and a second output voltage; adjusting the first modulation signal and the second modulation signal according to a clock signal for making a first starting time of the first modulation signal be different from a second starting time of the second modulation signal; and generating the first output voltage and the second output voltage according to the input voltage, the first modulation signal and the second modulation signal.

The modulation module comprises a first modulation unit coupled to a first converting module of the voltage converting device, for generating a first modulation signal according to an input voltage and a first output voltage, adjusting a first starting time of the first modulation signal according to a clock signal, and outputting the first modulating signal to the first converting module for making the first converting module generate the first output voltage according to the input voltage and the first modulation signal. The modulation module further comprises a second modulation unit coupled to a second converting module of the voltage converting device, for generating a second modulation signal according to the input voltage and a second output voltage, adjusting a second starting time of the second modulation signal according to the clock signal, and outputting the second modulating signal to the second converting module for making the second converting module generate the second output voltage according to the input voltage and the second modulation signal. In addition, the modulation module comprises a clock generating unit coupled to the first modulation unit and the second modulation unit, for generating the clock signal.

The voltage converting device of the present invention comprises a first converting module, for generating a first output voltage according to an input voltage and a first modulation signal; a second converting module for generating a second output voltage according to the input voltage and a second modulation signal; and a modulation module. The modulation module comprises a first modulation unit coupled to the first converting module, for generating the first modulation signal according to the input voltage and the first output voltage and adjusting a first starting time of the first modulation signal according to a clock signal; a second modulation unit coupled to the second converting module, for generating the second modulation signal according to the input voltage and the second output voltage, adjusting a second starting time of the second modulation signal according to the clock signal; and a clock generating unit coupled to the first modulation unit and the second modulation unit, for generating the clock signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
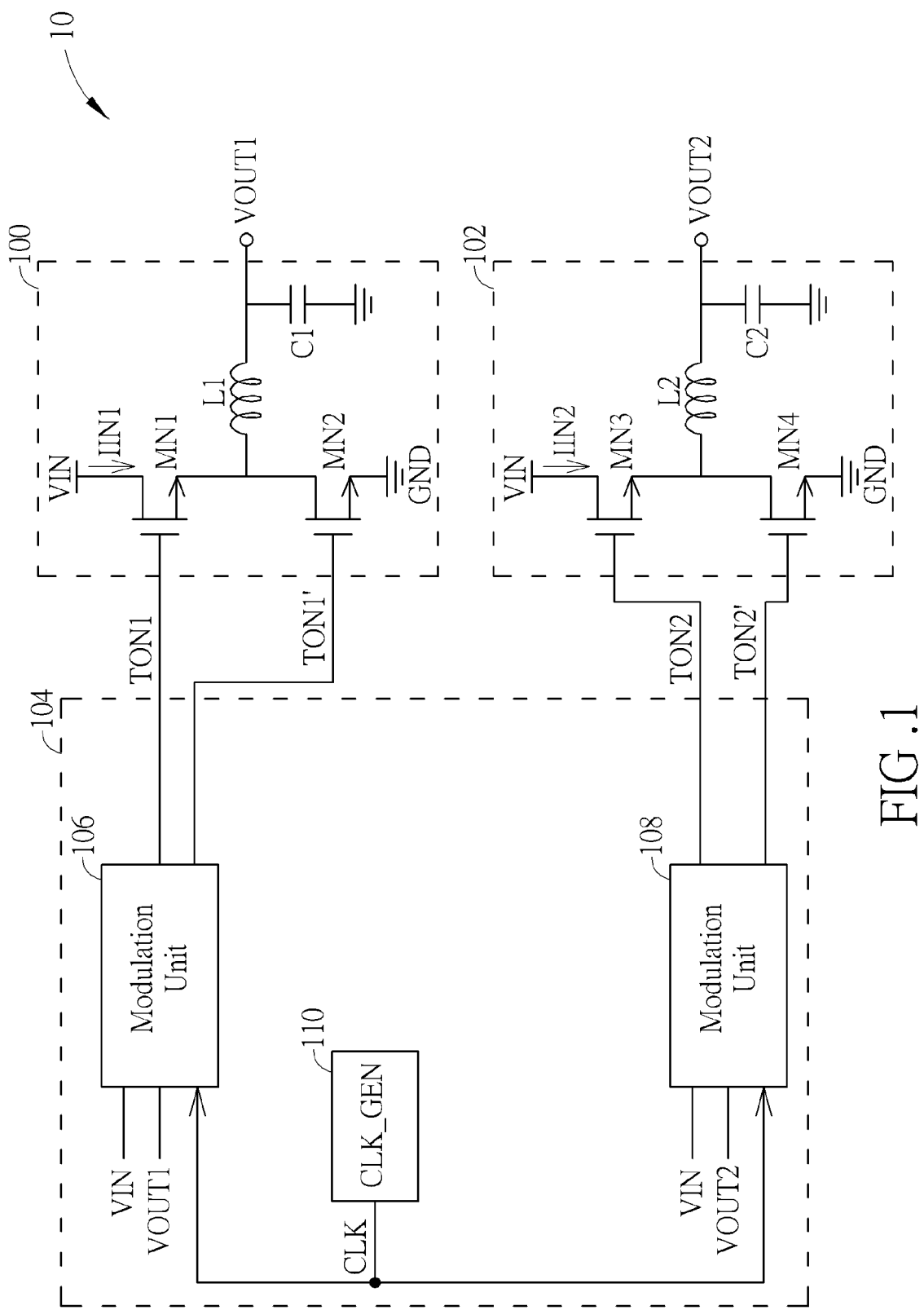
FIG. 1 is a schematic diagram of a voltage converting device according to an embodiment of the present invention.

Please refer to FIG. 1, which is a schematic diagram of a voltage converting device 10 according to an embodiment of the present invention. The voltage converting device 10 is utilized for generating output voltages VOUT1 and VOUT2 according to an input voltage VIN. For example, the voltage converting device 10 can be a single input dual output (SIDO) voltage regulator realized in constant on-time (COT) structure, but is not limited herein. As shown in FIG. 1, the voltage converting device 10 comprises converting modules 100 and 102, and a modulation module 104. The converting module 100 is utilized for generating the output voltage VOUT1 according to modulation signals TON1 and TON1' and the input voltage VIN. The modulation signal TON1' is an inverting signal of the modulation signal TON1, thus the modulation signals TON1 and TON1' can be regarded as the same modulation signal. Similarly, the converting module 102 is utilized for generating the output voltage VOUT2 according to modulation signals TON2 and TON2' and the input voltage VIN. The modulation module 104 comprises modulation units 106 and 108 and a clock generating unit 110, and is utilized for generating the modulations signals TON1, TON2 according to the output voltages VOUT1 and VOUT2 and the input voltage VIN. Please note that, since the modulation signals TON1' and TON2' are the inverting signals of the modulation signals TON1 and TON1, respectively, the modulation signals TON1 and TON1' and the modulation signals TON2 and TON2' can be regarded as the same modulation signals. For example, the modulation module 104 may be a pulse-width modulation integrated circuit, but is not limited herein. Please note that the modulation module 104 adjusts starting times TS1 and TS2 of the modulation signals TON1 and TON2 according to the clock signal CLK generated by the clock generating unit 110, for preventing the input voltage VIN from outputting currents IIN1 and IIN2 to the converting modules 100 and 102 at the same time. Accordingly, the disturbance of the input voltage VIN generated by generating the output voltages VOUT1 and VOUT2 can be reduced and the stability of the voltage converting device 10 is therefore improved.

In this embodiment, the converting module 100 comprises transistors MN1 and MN2, an inductor L1 and a capacitor C1. The converting module 100 switches connections between the inductor L1, the input voltage VIN and the ground GND according to the modulation signal TON1, for generating the output voltage VOUT1. Similarly, the converting module 102 comprises transistors MN3 and MN4, an inductor L2 and a capacitor C2. The converting module 102 switches connections between the inductor L2, the input voltage VIN and the ground GND according to the modulation signal TON2, for generating the output voltage VOUT2. The operation methods of the modulation modules 100 and 102 should be well-known to those with ordinary skill in the art, and are not narrated herein for brevity. Modulation unit 106 generates the modulation signal TON1 according to the ratio of the output voltage VOUT1 to the input voltage VIN (i.e.

$$\left(i.e.\ \frac{VOUT1}{VIN}\right)$$

and the modulation unit the output voltage VOUT2 to the input voltage VIN (i.e. 102 generates the modulation signal TON2 according to the ratio of $$\left(i.e.\ \frac{VOUT2}{VIN}\right).$$

The clock generating unit 110 is used to generate the clock signal CLK to the modulation units 106 and 108. Next, the modulation units 106 and 108 adjust the starting times TS1 and TS2 of the modulation signals TON1 and TON2 according to the clock signal CLK, respectively, for making the starting time TS1 of the modulation signal TON1 different from the starting time TS2 of the modulation signal TON2. In other words, via adjusting the starting times TS1 and TS2 of the modulation signals TON1 and TON2 according to the clock signal CLK, the converting modules 100 and 102 receive the currents IIN1 and IIN2 from the input voltage VIN at different times. In such a condition, the disturbance on the input voltage VIN can be reduced and the stability of the voltage converting device 10 can be enhanced.

Please note that the clock generating unit 100 can be realized in various methods according to different requirements and different design concepts. For example, the clock generating unit 110 can be a clock generator such as a crystal oscillator, a phase-lock loop and a delay-lock loop, and is not limited herein.

Figure 2:
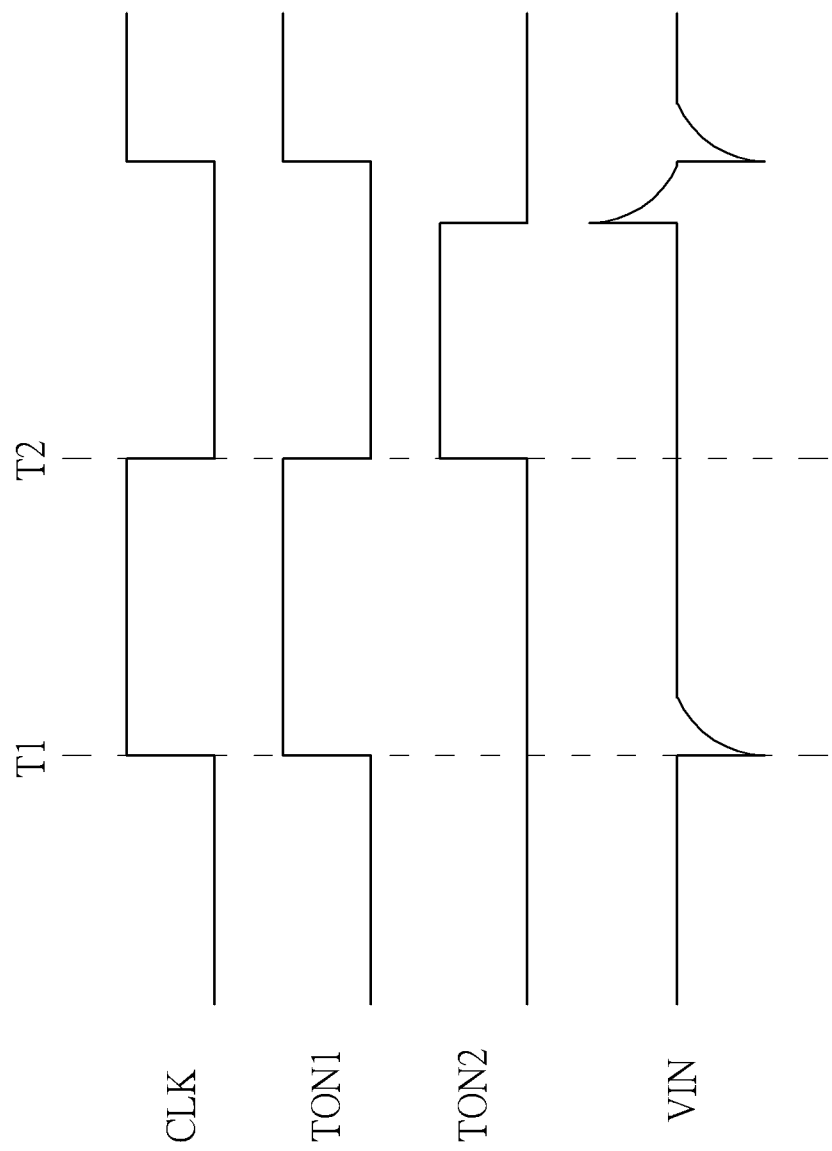
FIG. 2 is a schematic diagram of related signals when the voltage converting device shown in FIG. 1 operates.

Please refer to FIG. 2, which is a schematic diagram of related signals when the voltage converting device 10 shown in FIG. 1 operates. As show in FIG. 2, after the clock generating unit 110 generates the clock signal CLK, the modulation units 106 and 108 respectively adjust the modulation signals TON1 and TON2 according to the clock signal CLK. In this example, the modulation unit 106 adjusts the starting time TS1 of the modulation signal TON1 (i.e. the time of the rising edge of the modulation signal TON1) to be a time T1 of the rising edge of the clock signal CLK. In other words, the starting time TS1 of the modulation signal TON1 aligns with the time T1 of the rising edge of the clock signal CLK. The modulation unit 108 adjusts the starting time TS2 of the modulation signal TON2 (i.e. the time of the rising edge of the modulation signal TON2) to be a time T2 of the falling edge of the clock signal CLK. In other words, the starting time TS2 of the modulation signal TON2 aligns with the time T2 of the falling edge of the clock signal CLK. Since the starting times of the modulation signals TON1 and TON2 are staggered, the disturbance on the input voltage VIN can be reduced, so as to enhance the stability of the voltage converting device 10.

Figure 3:
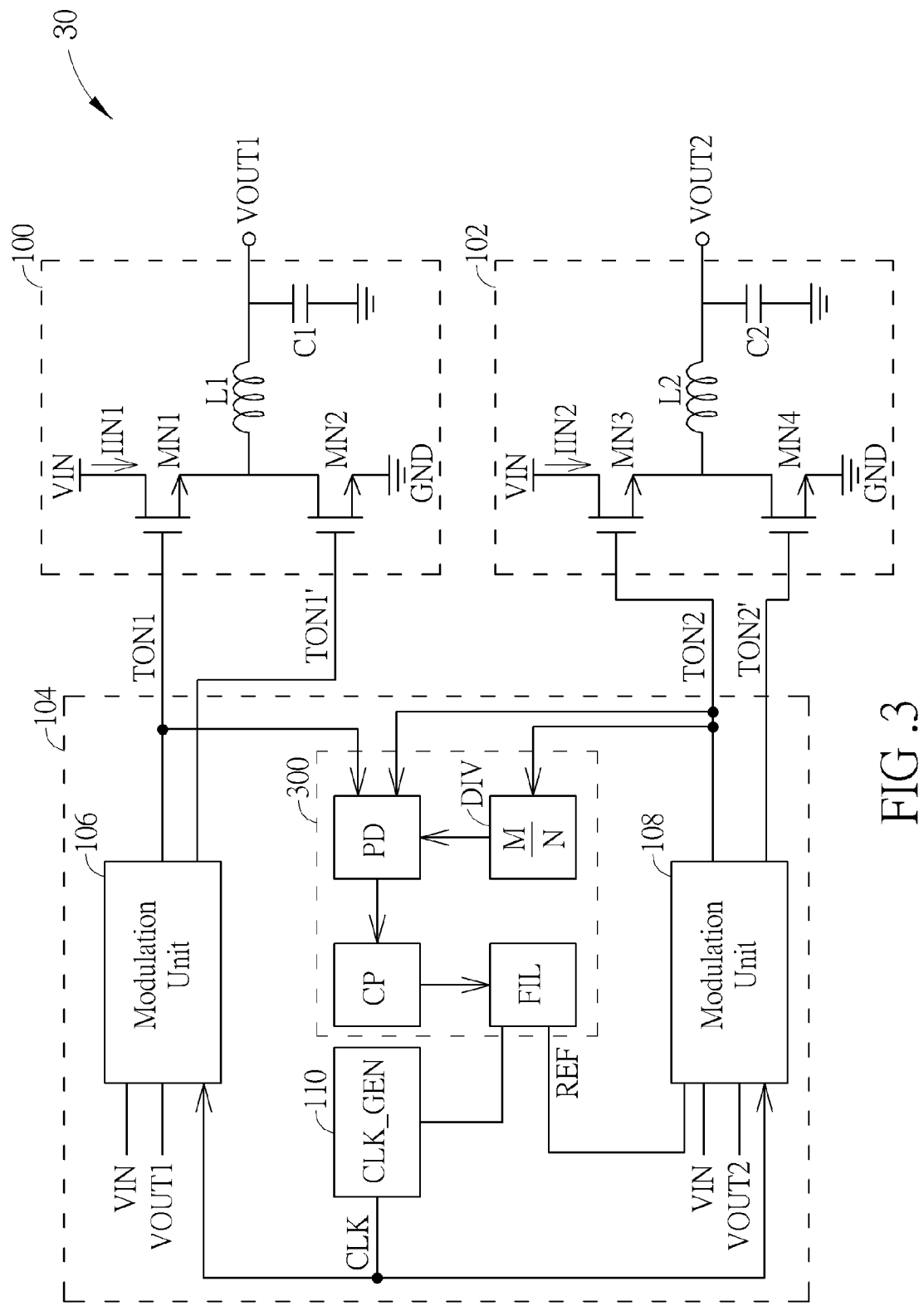
FIG. 3 is a schematic diagram of another voltage converting device according to an embodiment of the present invention.

The voltage converting device 10 can also adjust the frequency and the on-period of the modulation signals TON1 and TON2 for optimizing the performance of the voltage converting device 10. Please refer to FIG. 3, which is a schematic diagram of a voltage converting device 30 according to an embodiment of the present invention. The voltage converting device 30 is similar to the voltage converting device 10 shown in FIG. 1; thus, the signals and the components that have similar functions use the same symbols. Unlike the voltage converting device 10 shown in FIG. 1, the voltage converting device 30 includes a phase detecting unit 300 comprising a phase detector PD, a frequency divider DIV, a charge pump CP and a filter FIL. Before the modulation signal TON2 is transmitted to the phase detector PD, the modulation signal TON2 passes through the frequency divider DIV for multiplying the frequency of the modulation signal TON2 by a ratio $$\frac{M}{N}$$

(i.e. the frequency of the modulation signal TON2 divided by $$\frac{N}{M}).$$

The phase detector PD is utilized for detecting a phase difference between the modulation signal TON1 and the modulation signals TON2 being divided, for outputting a signal which corresponds to the phase difference to the charge pump CP. The charge pump CP generates a current (or voltage) signal to the filter FIL according to the signal corresponding to the phase difference. Finally, the filter FIL filters the high frequency part of the current (or voltage) signal generated by the charge pump CP and a reference signal REF corresponding to the phase difference between the modulation signal TON1 and the divided modulation signal TON2 is generated. The reference signal REF is transmitted to the modulation unit 108 for allowing the modulation unit 108 to adjust the on-period of the modulation signal TON2. For example, the reference signal REF generated by the filter FIL can be a reference voltage $\Delta V$. The modulation unit 108 generates the modulation signal TON2 according to the ratio of the difference between the output voltage VOUT2 and the reference voltage $\Delta V$ to the input voltage $$\left(\text{i.e. } \frac{VOUT2 - \Delta V}{VIN}\right).$$

In such a condition, the on-period of the modulation signal TON2 of the voltage converting device 30 can be appropriately adjusted (e.g. the on-period of the modulation signal TON2 is adjusted to be a product of the on-period of the modulation signal TON1 and $$\frac{N}{M}),$$

for further decreasing the electromagnetic interference generated by the voltage converting device 30.

Figure 4:
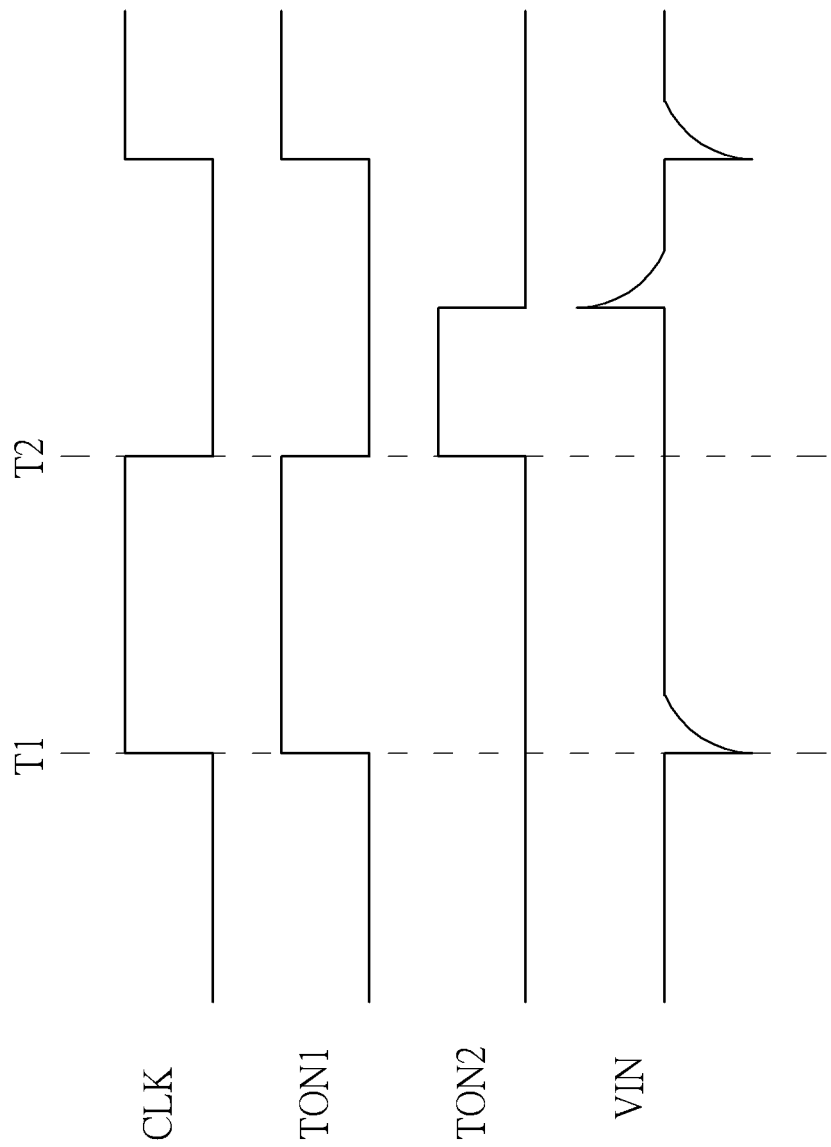
FIG. 4 is a schematic diagram of related signals when the voltage converting device shown in FIG. 3 operates.

Please refer to FIG. 4, which is a schematic diagram of related signals when the voltage converting device 30 operates. As shown in FIG. 4, after the clock generating unit 110 generates the clock signal CLK, the modulation units 106 and 108 respectively adjust the modulation signals TON1 and TON2 according to the clock signal CLK. In this example, the modulation unit 106 adjusts the starting time TS1 of the modulation signal TON1 to be the time T1 of the rising edge of the clock signal CLK and the modulation unit 108 adjusts the starting time TS2 to be the time T2 of the falling edge of the clock signal CLK. An on-period OP2 of the modulation signal TON2 is adjusted to be half an on-period OP1 of the modulation signal TON1 (i.e. the on-period OP2 is divided by 2, which is the frequency dividing factor of the frequency divider DIV) in this example. Please note that, since the loadings of the output voltages VOUT1 and VOUT2 are the same in this example, the modulation signals TON1 and TON2 have the same off-period. In other words, the frequency of the modulation signal TON2 is changed when the on-period OP2 of the modulation signal TON2 is adjusted. As a result, the disturbance on the input voltage VIN and the electromagnetic interference generated by the voltage converting device 30 can be decreased.

Please note that the above examples use the clock signal generated by the clock generating unit to stagger the starting times of different modulation signals, for reducing the disturbance of the input voltage in the voltage converting device. The above example can further use the phase detecting unit to adjust the frequency of the modulation signal for decreasing the electromagnetic interference generated by the voltage converting device. Those with ordinary skill in the art may observe appropriate alternations and modifications.

Figure 5:
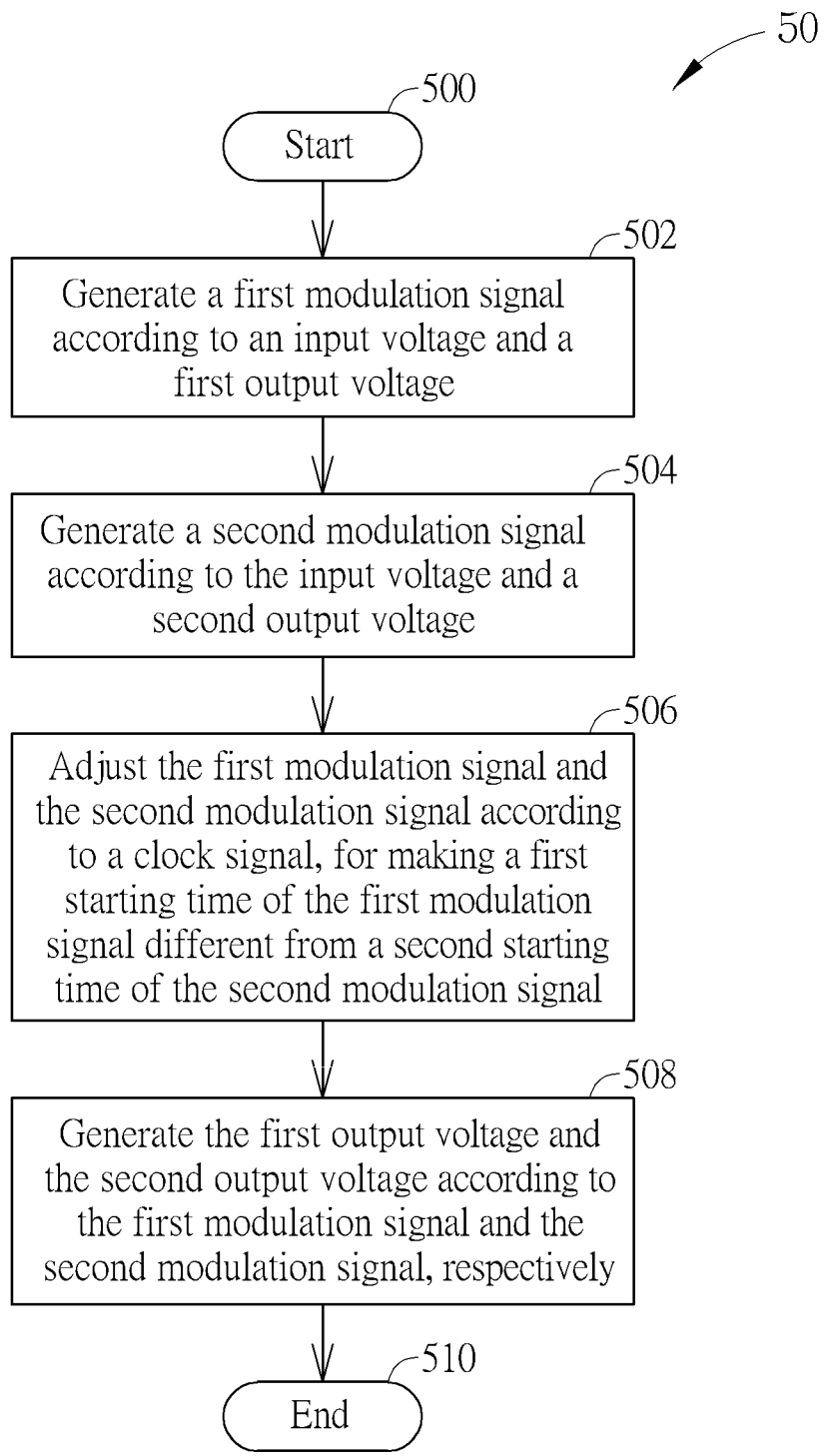
FIG. 5 is a flowchart of a modulation method according to an embodiment of the present invention.

The method of the voltage converting device 10 adjusts the starting times of the modulation signals TON1 and TON2 can be summarized to a modulation method 50 as shown in FIG. 5. Please note that the sequence of the modulation method 50 is not limited to the sequence shown in FIG. 5, as long as the same result can be achieved. The modulation method 50 can be used in a voltage converting device and comprises the following steps:

Step 500: Start.

Step 502: Generate a first modulation signal according to an input voltage and a first output voltage.

Step 504: Generate a second modulation signal according to the input voltage and a second output voltage.

Step 506: Adjust the first modulation signal and the second modulation signal according to a clock signal, for making a first starting time of the first modulation signal different from a second starting time of the second modulation signal.

Step 508: Generate the first output voltage and the second output voltage according to the first modulation signal and the second modulation signal, respectively.

Step 510: End.

According to the modulation method 60, the voltage converting device can stagger the first starting time of the first modulation signal and the second starting time of the second modulation signal and the input voltage of the voltage converting device does not output current for generating the first output voltage and the second output voltage at the same time. Accordingly, the disturbance on the input voltage can be decreased and the stability of the voltage converting device can be enhanced. The operations of the modulation method 50 are detailed in the above paragraphs, and are therefore not narrated herein for brevity.

Figure 6:
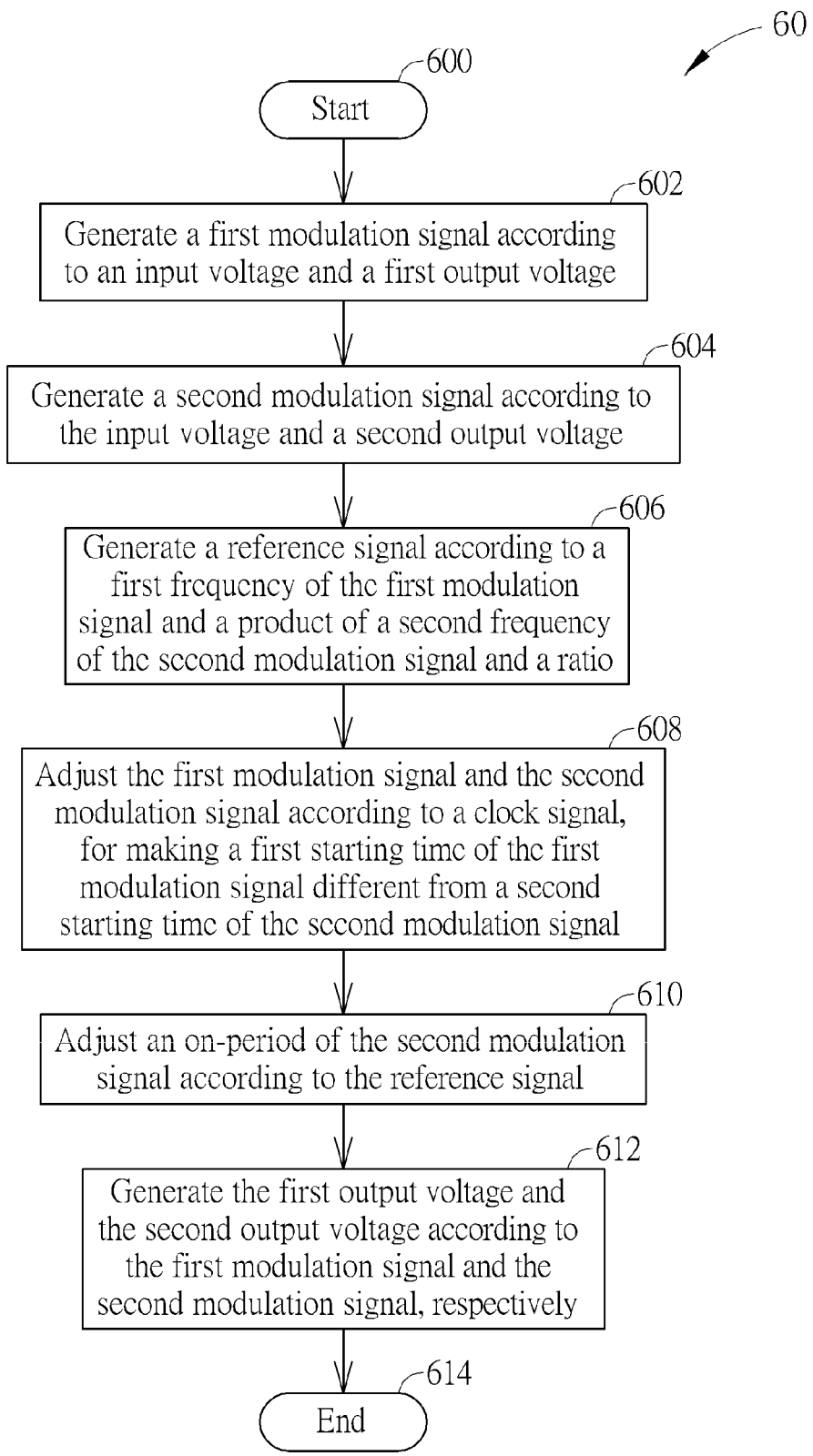
FIG. 6 is a flowchart of another modulation method according to an embodiment of the present invention.

The method of the voltage converting device 30 adjusting the starting times of the modulation signals TON1 and TON2 can be summarized by a modulation method 60 as shown in FIG. 6. Please note that the sequence of the modulation method 60 is not limited to the sequence shown in FIG. 5, as long as the same result can be achieved. The modulation method 60 can be used in a voltage converting device and comprises the following steps:

Step 600: Start.

Step 602: Generate a first modulation signal according to an input voltage and a first output voltage.

Step 604: Generate a second modulation signal according to the input voltage and a second output voltage.

Step 606: Generate a reference signal according to a first frequency of the first modulation signal and a product of a second frequency of the second modulation signal and a ratio.

Step 608: Adjust the first modulation signal and the second modulation signal according to a clock signal, for making a first starting time of the first modulation signal different from a second starting time of the second modulation signal.

Step 610: Adjust an on-period of the second modulation signal according to the reference signal.

Step 612: Generate the first output voltage and the second output voltage according to the first modulation signal and the second modulation signal, respectively.

Step 614: End.

According to the modulation method 60, the voltage converting device can stagger the first starting time of the first modulation signal and the second starting time of the second modulation signal and the input voltage of the voltage converting device does not output current for generating the first output voltage and the second output voltage at the same time. Accordingly, the disturbance on the input voltage can be decreased and the stability of the voltage converting device can be enhanced. Furthermore, the on-period of the second modulation signal can be appropriately adjusted according to different loadings (e.g. adjusted to be a product of an on-period of the first modulation signal and the ratio). The electromagnetic interference of the voltage converting device is therefore decreased. The operations of the modulation method 60 are detailed in the above paragraphs, and are therefore not narrated herein for brevity.

To sum up, the modulation method, modulation module and voltage converting device thereof disclosed in the above embodiments reduce the disturbance on the input voltage via dynamically adjusting the starting times of different modulation signals. The stability of the voltage converting device is thereby enhanced. The modulation method, modulation module and voltage converting device thereof disclosed in the above embodiments can also adjust the frequencies and the on-periods of different modulation signals, to decrease the electromagnetic interference of the voltage converting device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A modulation method for a voltage converting device, the modulation method comprising:
   generating a first modulation signal according to an input voltage and a first output voltage;
   generating a second modulation signal according to the input voltage and a second output voltage;
   generating a reference signal according to a phase difference between a first phase of the first modulation signal and a second phase of a product of the second modulation signal and a ratio;
   generating a clock signal according to the reference signal;
   adjusting the second modulation signal according to the clock signal for making a first starting time of the first modulation signal be different from a second starting time of the second modulation signal and for locking a time difference between the first starting time and the second starting time;
   adjusting an on-period of the second modulation signal to be a product of an on-period of the first modulation signal and the ratio according to the reference signal;
   generating the first output voltage according to the input voltage and the first modulation signal; and
   generating the second output voltage according to the input voltage and the second modulation signal;
   wherein the first output voltage and the second output voltage are separate voltages of different output nodes of the voltage converting device;
   wherein the ratio is not 1.

2. A modulation module, for a voltage converting device, the modulation module comprising:
   a first modulation unit coupled to a first converting module of the voltage converting device, for generating a first modulation signal according to an input voltage and a first output voltage of the first converting module, and outputting the first modulating signal to the first converting module for making the first converting module generate the first output voltage according to the input voltage and the first modulation signal;
   a second modulation unit coupled to a second converting module of the voltage converting device, for generating a second modulation signal according to the input voltage and a second output voltage of the second converting module, adjusting the second modulation signal according to a clock signal to make a first starting time of the first modulation signal be different from a second starting time of the second modulation signal and to lock a time difference between the first starting time and the second starting time, outputting the second modulating signal to the second converting module for making the second converting module generate the second output voltage according to the input voltage and the second modulation signal, and adjusting an on-period of the second modulation signal to be a product of an on-period of the first modulation signal and the ratio according to the reference signal;
   a phase detecting unit, for generating a reference signal according to a phase difference between the first modulation signal and a product of the second modulation signal and a ratio; and
   a clock generating unit coupled to the first modulation unit, the second modulation unit and the phase detecting unit, for generating the clock signal according to the reference signal;
   wherein the first output voltage and the second output voltage are separate voltages;
   wherein the ratio is not 1.

3. A voltage converting device, comprising:
   a first converting module, for generating a first output voltage according to an input voltage and a first modulation signal;
   a second converting module for generating a second output voltage according to the input voltage and a second modulation signal; and
   a modulation module, comprising:
      a first modulation unit coupled to the first converting module, for generating the first modulation signal according to the input voltage and the first output voltage;
      a second modulation unit coupled to the second converting module, for generating the second modulation signal according to the input voltage and the second output voltage, adjusting the second modulation signal to make a first starting time of the first modulation signal be different from a second starting time of the second modulation signal and to lock a time difference between the first starting time and the second starting time, and adjusting an on-period of the second modulation signal to be a product of an on-period of the first modulation signal and the ratio according to the reference signal;
      a phase detecting unit, for generating a reference signal according to a phase difference between the first modulation signal and a product of the second modulation signal and a ratio; and
      a clock generating unit coupled to the first modulation unit, the second modulation unit and the phase detecting unit, for generating the clock signal according to the reference signal;
   wherein the first output voltage and the second output voltage are separate voltages;
   wherein the ratio is not 1.

* * * * *